United States Patent

[11] 3,631,936

[72] Inventor Frederick G. Schweser
P.O. Box J, West Military Road, Frement, Nebr. 68025
[21] Appl. No. 768
[22] Filed Jan. 5, 1970
[45] Patented Jan. 4, 1972

[54] FLOATING WHEEL AND POWER ASSEMBLY MOTORCYCLES
10 Claims, 4 Drawing Figs.

[52] U.S. Cl............................................. 180/32, 188/74
[51] Int. Cl.......................................... B62k 11/10
[50] Field of Search.......................... 180/32, 33, 29, 30, 31; 188/29, 74

[56] References Cited
UNITED STATES PATENTS

| | | | |
|---|---|---|---|
| 2,589,793 | 3/1952 | Franks............... | 180/32 |
| 3,517,764 | 6/1970 | Wendt................ | 180/33 |
| 583,809 | 6/1897 | Libbey............... | 180/33 |
| 3,024,860 | 3/1962 | Nicolai............... | 180/32 |
| 2,738,034 | 3/1956 | Levine................ | 188/74 X |
| 2,800,189 | 7/1957 | Kummer............. | 280/281 X |
| 3,493,085 | 2/1970 | Libhart.............. | 188/74 |
| 3,483,937 | 12/1969 | Vann................. | 180/32 |
| 2,551,982 | 5/1951 | Verkins.............. | 180/32 X |
| 1,368,541 | 2/1921 | Bradshaw........... | 180/35 |

FOREIGN PATENTS

| | | | |
|---|---|---|---|
| 1,051,861 | 1/1954 | France................ | 180/32 |

Primary Examiner—Leo Friaglia
Assistant Examiner—John P. Silverstrim
Attorney—Gustave Miller ABSTRACT: This device has a floating wheel and power subassembly forming a part of motorcycle, mini-bike or scooter. the cycle frame consisting of a rear subassembly floatably mounted on a front subassembly. The rear subassembly includes a rear subframe, consisting of a U-member between the legs of which the rear power wheel is rotatably mounted with a motor mounted on the forward bight end of the U-member, a brakeshoe eccentrically pivoted on the U-legs between the wheel and the motor, and a jack stand pivoted beneath the motor. A front subassembly has its rear portion resiliently supported on the rear ends of the rear subframe legs, and the front ends of the legs, under the motor, are pivotally secured to an intermediate portion of the front subassembly.

A fuel tank is supported on the motor. The front subassembly consists of a horizontal U-member with forwardly extending converging legs supported on two vertical U-members with upwardly diverging legs, the rear legs supporting the operator's seat, the front legs secured with the front legs of the horizontal U and pivotally connected with a pair of front wheel fork members and handlebars.

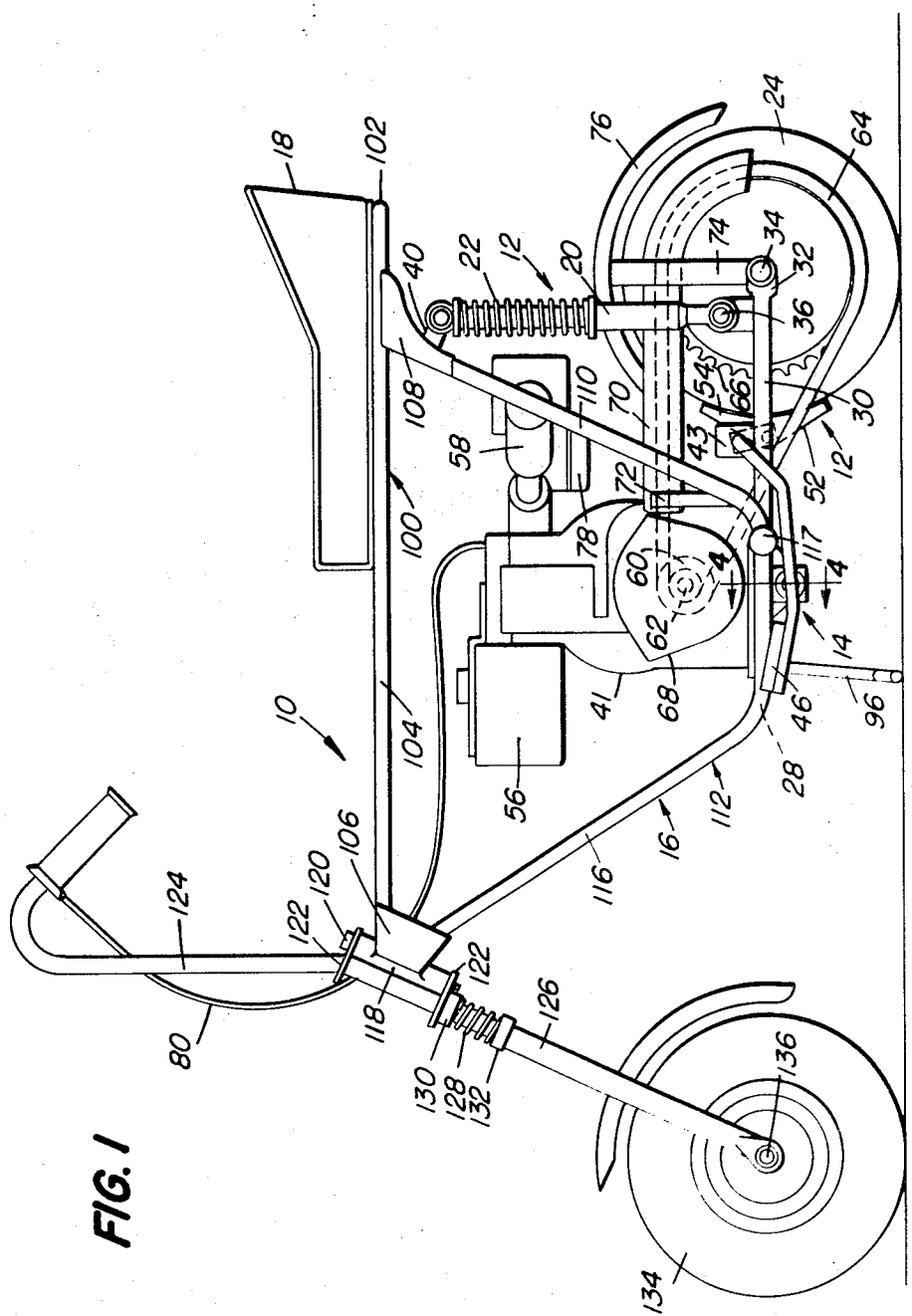

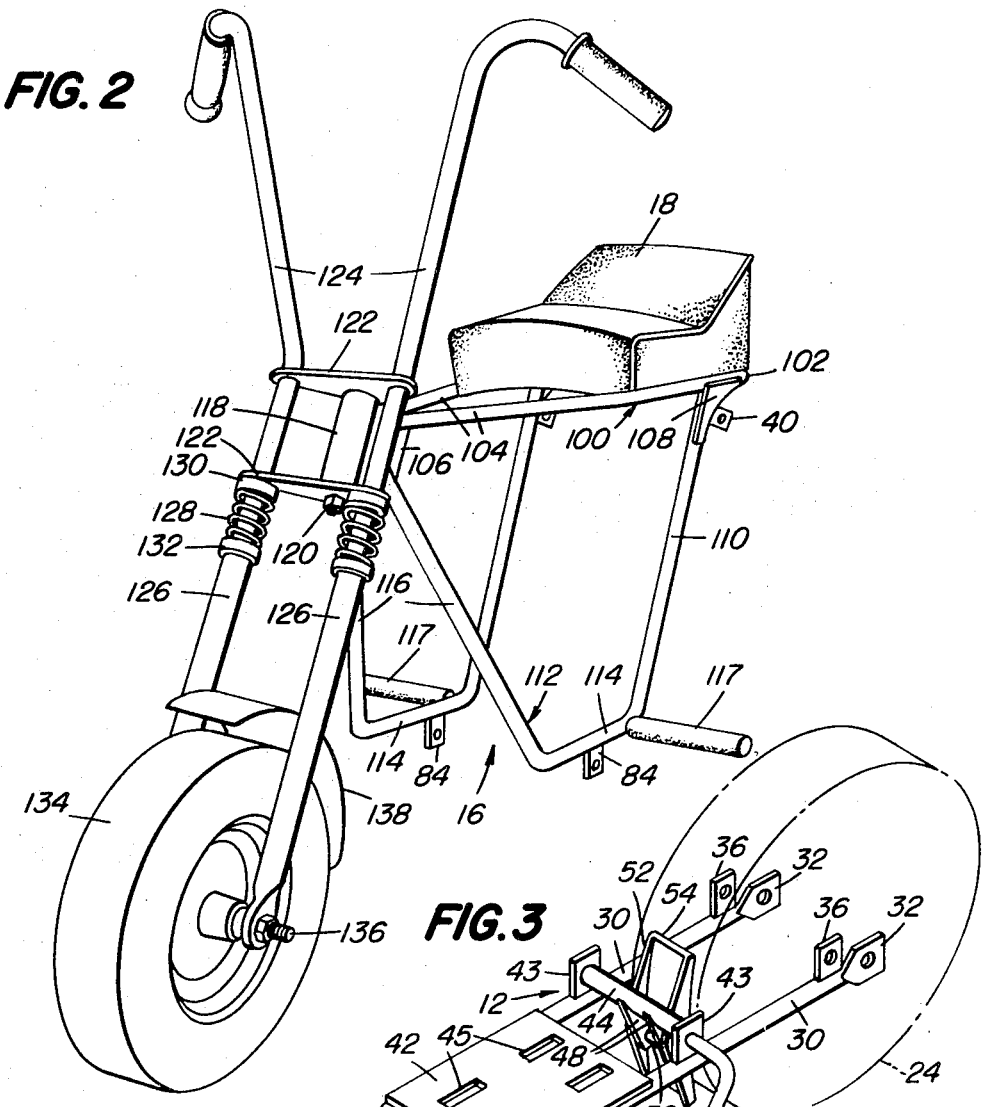
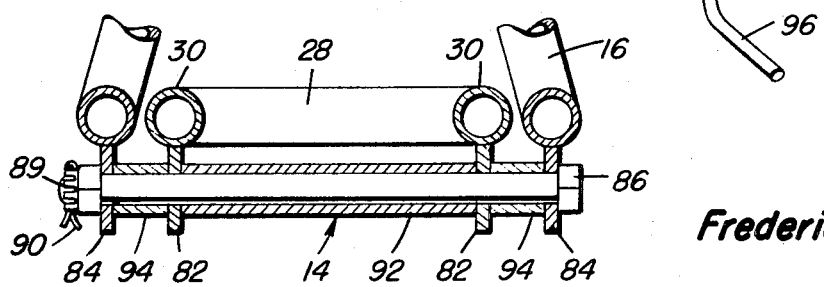

3,631,936

FLOATING WHEEL AND POWER ASSEMBLY MOTORCYCLES

OBJECTS OF THIS INVENTION

It is an object of this invention to provide a motorcycle, scooter or mini-bike having a floating wheel and power assembly wherein the rider supporting frame is entirely free of engine vibration, which floats the motor on a rear subframe on the rear wheel, with the fuel tank and muffler supported on the motor, including a rear mudguard and chain guard on the chain between the rear wheel and the motor, so that all possible vibration producing parts are no longer direct parts of the assembly on which the rider is seated.

A further object of this invention is to provide a motorcycle having improved riding and handling qualities.

A further object of this invention is to provide a low-cost motorcycle having simplified parts, and to eliminate the troublesome jackshaft and chain assemblies which are necessary in other types of assemblies.

A further object of this invention is to provide a low cost improvement over the disclosure in U.S. Pat. No. 2,522,867, which discloses a motorcycle wherein only the rear wheel alone is floatably mounted on the front assembly.

BRIEF DESCRIPTION OF THE FIGURES

With the above and related objects in view, this invention consists in the details of construction and combination of parts, as will be more fully understood from the following description, when read in conjunction with the accompanying drawing, in which:

FIG. 1 is a side elevation of the motorcycle of this invention.

FIG. 2 is a perspective view of the front end and front subassembly.

FIG. 3 is a perspective view of the subframe of the rear subassembly.

FIG. 4 is a section on line 4—4 of FIG. 1, showing the pivot connection of the rear subassembly to the front subassembly.

DETAILED DESCRIPTION OF THE INVENTION

There is shown at 10 in FIG. 1 the complete motorcycle, scooter, or mini-bike of this invention including the rear subassembly 12 pivotally secured at 14 to the front subassembly 16, the rear end seat carrying portion with a rider's seat 18 being resiliently supported by shock absorbers 20 and coil springs 22 directly over the rear wheel 24 of the rear subassembly 12. The rear floating power and wheel subassembly 12 includes a substantially horizontal U-shaped frame member 26 having a forwardly extending bight portion 28 and two spaced apart U-legs 30 on the ends of which are mounted ears 32 through which is secured a rear-wheel axle 34 for rotatively mounting the rear wheel 24. Adjacent the axle ears 32 are upstanding ears 36 for pivotally supporting the shock absorbers 20 and coil springs 22, the upper ends of the shock absorbers 20 being pivoted to ears 40 on the front frame assembly 16 directly under the rider's seat 18.

Adjacent the U-frame bight 28 is a baseplate 42 on which a motor 41 is stabilized in its slots 45. Intermediate the baseplate 42 and the rear wheel 24 is located an upstanding pivot ear 43 on each leg 30. A crank rod 44 pivoted through ears 43 terminates in a brake foot pedal 46. Extending downwardly from the rod 44 are a pair of angular ears 48 through which is pivoted a bolt 50 extending through eyes in wings 52 of a brakeshoe 54, so that the rider pressing his foot down on the pedal 46 will eccentrically pivot the brakeshoe 54 to braking contact with the periphery of the wheel 24.

Supported on the top of motor 41 is a fuel tank 56 extending forwardly therefrom, and extending rearwardly therefrom is a muffler 58. Power from the motor 41 for rotating the wheel 24 is transmitted from a small sprocket wheel 60 on the motor power shaft 62 via a sprocket chain 64 to a large sprocket wheel 66 mounted on the rear wheel 24. Obviously, a belt and pulleys may be substituted for the chain and sprocket wheels. A pants guard 68 covers the sprocket wheel 60, and a chain guard 70 is supported over the chain 64 on a strut 72 on baseplate 42 and on the same mudguard support 74 that supports the mudguard 76. A conventional carburetor 78 is controlled in a conventional manner by a conventional flexible throttle control 80 terminating on one of the handlebars 124 of the front frame subassembly 16. Obviously, the motor 41 and its details are conventional and commercially available as desired.

Depending from each leg 30 beneath the baseplate 42 is a subassembly pivot ear 82 through which the rear subassembly 12 is pivotally connected to depending ears 84 on front subassembly 16 as shown in detail in FIG. 4. A pivot bolt 86 with a lock nut 88 and cotter pin 90 extends through the aligned ears 82 and 84 and through spacing bushings 92 and 94.

As will be apparent, the rear subassembly 12 is pivotally secured at its forward portion to an intermediate portion of the front subassembly 16, and the front subassembly 16 is resiliently supported at its rear portion by the shock absorbers 20 and coil springs 22 with the rider's seat 18 directly over the wheel 24, thus assuring good traction. A conventional jack stand 96 is pivoted at 98 to the bottom of baseplate 42 for supporting the motorcycle 10 when stationary, and may be conventionally folded up out of the way when the cycle is in operation. So much for the rear subassembly 12.

Now for the front subassembly 16. This consists of a horizontal U-member 100 having its bight 102 at the rear, on which the seat 18 is mounted, with its legs 104 converging forwardly and secured in vertical gusset plates 106. Secured by an angle plate 108 adjacent the bight end of each horizontal leg 104 is an upwardly rearwardly diverging leg 110 of a vertically extending U-member 112, the U-member 112 having a horizontal bight 114 and an upwardly forwardly extending leg 116 secured to the same gusset plates 106.

It is from these horizontal bights 114 that the pivot ears 84 of the front subassembly depend. Extending outwardly from the angle between rear upward leg 110 and horizontal bight 114 is a rider's foot rest rod 117. Secured between the gusset plates 106 at their rear angles is a hollow shaft 118 through which extends a pivot bolt and nut 120, which bolt and nut 120 also extends between a pair of spaced apart somewhat horizontal gusset plates 122. Handlebars 124 extend down through the forward two angles of gusset plates 122 and have their lower ends telescopically mounted in the top ends of at least partially hollow fork bars 126; coil springs 128 provide resilient bias between shoulders 130 on adjacent lower ends of handlebars 124 and shoulders 132 adjacent the upper ends of fork bars 126. A front wheel 134 is conventionally rotatably mounted on axle 136 through the bottom ends of fork bars 126, and a front mudguard 138 is conventionally secured to the fork bars 126 over the front wheel 134.

OPERATION OF THE INVENTION

In operation, the cycle 10 may be a full-size motorcycle, or may be a scooter or mini-bike as shown, depending on the size of the wheels 24 and 134 and the power of the commercially available motor 41 that is selected. With the rider seated on the seat 18 and his feet on footrest rods 117, he may control the operation by the throttle control 80. Vibration of the operating parts, such as the motor and power transmission therefrom to the rear wheel 24 will not readily be transmitted to the rider due to the pivotal connection 14 between the front and rear subassemblies 16 and 12, and the resilient support of the seat 18 by the shock absorbers 20 and coil springs 22 over the rear wheel 24. A comfortable, uncomplicated and yet low-cost cycle is thus provided irrespective of the size of wheels and power plants provided.

ABSTRACT OF THE DRAWING

In the drawings, like numbers refer to like parts, and for the purposes of explication, set forth below are the numbered parts of the improved Floating Wheel And Power Assembly Motorcycle:

10 complete motorcycle, mini-bike or scooter 12 rear subassembly
14 pivotal connection 12 to 16
16 front subassembly
18 rider's seat
20 shock absorbers
22 coil springs
24 rear wheel of 10
26 U-shaped frame member of 12
28 forwardly extending bight of 26
30 U-legs of 26
32 axle-mounting ears
34 rear-wheels axle
36 shock absorber mounting ears on 12
40 shock absorber mounting ears on 16
41 motor
42 motor-supporting base plate
43 pivot ears for brake crank rod 44
44 brake crank rod
45 motor securing slots in baseplate 42
46 brake foot pedal on 44
48 downwardly extending angular ears on 44
50 pivot bolt for wings 52 of brakeshoe 54
52 wings of 54
54 brakeshoe
56 fuel tank
58 muffler
60 sprocket wheel on 62
62 motor power shaft
64 sprocket chain
66 large sprocket wheel on rear wheel 24
68 pants guard
70 chain guard
72 supporting strut for 70
74 mudguard support
76 mudguard for 24
78 carburetor
80 throttle control
82 rear subassembly pivot ears depending from 30 of 12
84 front subassembly pivot ears on 114 of 16
86 pivot bolt through 82 and 84
88 locknut on 86
90 cotter pin for 88
92 center bushing on 86
94 end bushings on 86
96 jack stand
98 pivot for 96
100 horizontal U-member of 16
102 rearwardly extending bight of 100
104 legs of 100
106 vertical gusset plates
108 angle plates connecting 100 to 110
110 upwardly rearwardly extending legs of 112
112 vertical U-members of 16
114 horizontal bight of 112
116 upwardly and forwardly extending legs of 112
117 rider's foot rest rod
118 pivot shaft for 120
120 pivot bolt and nut through 118 and 122
122 horizontal gusset plates
124 handlebars
126 partially hollow fork bars
128 coil springs between 124 and 126
130 spring bias shoulder on 124
132 spring bias shoulder on 126
134 front wheel
136 front axle
138 front mudguard Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A motorcycle comprising a front subassembly (16) having a front subframe (100 and 112) including a substantially horizontal U-member (100) having its bight (102) at the rear providing a saddle support and a pair of converging front legs (104); a pair of laterally spaced vertically extending U-members (112) having substantially horizontal bights (114), upwardly, rearwardly diverging legs (110) secured to and supporting said horizontal U-member bight (102), and upwardly forwardly converging U-legs (116) being secured to and rigid with the ends of said pair of converging front legs (104); a floating rear subassembly having a rear subframe comprising a horizontal U-shaped frame member (26) having a forwardly extending bight portion (28) and two rearwardly extending spaced apart U-legs (30), axle-mounting means (32) on the ends of said spaced apart U-legs, an axle (34) thereon, and a rear wheel rotatively mounted on said axle between said spaced apart U-legs; means (82, 86) for pivotally securing said forwardly extending bight portion of said rear subframe to ears (84) mounted on said horizontal bights (114) of said front subframe (112), said forwardly extending bight extending between said horizontal bights; means (20 and 22) for resiliently supporting said saddle support (18 and 102) of said front subframe (100) on said spaced apart U-legs of said rear subframe; a cycle motor (41) securely supported on the forwardly extending bight portion of said rear subframe; means (60, 62, 64 and 66) operatively connecting said rear wheel to said motor; and a baseplate (42) mounted on said U-legs (30), adjacent said forwardly extending bight (28), providing support for said motor, whereby said front subframe is entirely free of engine vibration.

2. The cycle (10) of claim 1, and front-wheel (134) fork means (126 and 124), means (118 and 120) pivotally mounting the front end (106) of said front subframe (100 and 112) on said fork means (126 and 124), a front wheel (134) rotatively mounted on an axle (136) mounted on the lower ends of said fork means (126), and handlebar (124) means extending upwardly from said fork means (126).

3. The cycle (10) of claim 1, and a rider-supporting seat (18) mounted on said front subframe (100) directly over said resilient supporting means (20 and 22).

4. The cycle (10) of claim 1, and rear wheel (24) brake means (46, 54) mounted on said rear subframe (26).

5. The cycle (10) of claim 4, said brake means comprising a pedal crank arm rod (44) pivotally supported (43) on said rear subframe (26) forwardly of said rear wheel (24), a foot pedal mounted on said pedal rod (44), and a wheel (24) contactable brakeshoe (54) eccentrically (48 and 50) mounted on said crank arm rod (44) for braking said wheel (24) on depressing said foot pedal (46).

6. The cycle (10) of claim 1, said resilient means being a coil spring (22) and a shock absorber (20) pivoted (40) at its top end to said front subframe (100) and at its bottom end (36) to said rear subframe (26).

7. The cycle of claim 1, and a fuel tank (56) supported on said motor (41) on said rear subframe (26).

8. The cycle (10) of claim 1, and a rear wheel (24) contactable brakeshoe (54) eccentrically pivoted (43) on said U-legs (30) intermediate said baseplate (42) and said rear wheel (24).

9. The cycle of claim 2, said means, (118, 120, 122) pivotally mounting said fork means (124, 126) and said front subframe (100, 112) together comprising a somewhat vertical hollow shaft (118) secured to said leg (104, 116) securing means (106), a pair of spaced apart somewhat horizontal gusset plates (122) secured on said handlebars (124) adjacent their lower ends, and means (120) pivotally securing said hollow shaft (118) between said gusset plates (122).

10. The cycle of claim 9, said fork means (126) comprising a pair of spaced apart hollow bars, and means (130, 132) resiliently (128) telescopically supporting the lower ends of said handlebars (124) below said gusset plates (122) in the upper ends of said hollow fork bars (126).

* * * * *